(12) United States Patent
Okumatsu

(10) Patent No.: US 8,575,885 B2
(45) Date of Patent: Nov. 5, 2013

(54) MOTOR DRIVE SYSTEM, CONTROL METHOD OF MOTOR DRIVE SYSTEM, AND TRAVELING DEVICE

(75) Inventor: Yoshihiro Okumatsu, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 362 days.

(21) Appl. No.: 13/123,270

(22) PCT Filed: Jan. 25, 2010

(86) PCT No.: PCT/JP2010/000401
§ 371 (c)(1),
(2), (4) Date: Apr. 8, 2011

(87) PCT Pub. No.: WO2011/089656
PCT Pub. Date: Jul. 28, 2011

(65) Prior Publication Data
US 2011/0298404 A1    Dec. 8, 2011

(51) Int. Cl.
*H02P 27/04* (2006.01)
(52) U.S. Cl.
USPC .......... 318/801; 318/400.26; 318/400.27; 318/400.28; 318/400.29; 318/800; 310/132; 310/146; 363/40; 363/55; 363/98; 363/120; 363/130; 363/56.03; 363/56.04; 363/56.08; 363/56.1; 363/56.11
(58) Field of Classification Search
USPC .......... 318/400.2, 400.09, 721, 800, 801, 318/400.26, 400.27, 400.28, 400.29, 727; 363/16, 21.08, 27, 28, 34, 40, 55, 363/56.03, 56.04, 56.05, 56.07, 56.08, 57, 363/56.1, 56.11, 95, 98, 109, 120, 131, 363/175; 310/132, 146
See application file for complete search history.

(56) References Cited

U.S. PATENT DOCUMENTS

| | | | |
|---|---|---|---|
| 6,965,206 B2 | 11/2005 | Kamen et al. | |
| 7,098,619 B2* | 8/2006 | Stridsberg | 318/563 |
| 2006/0006824 A1* | 1/2006 | Stridsberg | 318/432 |

FOREIGN PATENT DOCUMENTS

| | | | |
|---|---|---|---|
| JP | 10-142372 A | 5/1998 | |
| JP | 10-181617 A | 7/1998 | |

(Continued)

OTHER PUBLICATIONS

International Search Report of PCT/JP2010/000401, Mar. 30, 2010.

*Primary Examiner* — Antony M Paul
(74) *Attorney, Agent, or Firm* — Kenyon & Kenyon LLP

(57) ABSTRACT

To make it possible to avoid an unstable state with a simple configuration even one of the phases of the motor fails. A motor drive system in accordance with the present invention includes a motor to which a plurality of phase coils of five phases or more are connected in a star connection, an inverter connected to one end of each of the phase coils, the inverter being configured to convert a DC power into an AC power and supply the AC power to each phase of the motor, a power relay disposed at another end of each of the phase coils, the power relay being configured so as to be able to cut off a supply power to at least one phase coil among the plurality of phase coils of the motor by using a plurality of contact points interposed between the star-connected coils, and a control unit that generates a control signal for the inverter and thereby controls driving of the motor. When one or more phase of the motor fails, the control unit opens a contact point of the power relay corresponding to the failed phase and drives three or more phases that are disposed at roughly equal phase-intervals among a plurality of remaining phases.

10 Claims, 17 Drawing Sheets

(56) References Cited

FOREIGN PATENT DOCUMENTS

| JP | 2004-120883 A | 4/2004 |
| JP | 2005-304119 A | 10/2005 |
| JP | 2007-269316 A | 10/2007 |
| JP | 2007-295658 A | 11/2007 |
| JP | 2008-067429 A | 3/2008 |
| JP | 4097494 A | 3/2008 |
| JP | 2009-095170 A | 4/2009 |
| JP | 2009-177915 A | 8/2009 |
| JP | 2009-217848 A | 9/2009 |

* cited by examiner

ANGLE[rad]

| FAILED PHASE | POWER RELAY TO BE OPENED | PHASES USED FOR DRIVING |
|---|---|---|
| a | P1 | b - d - e |
| b | P2 | c - d - a |
| c | P1 | b - e - d |
| d | P3 | e - b - c   OR   c - a - e |
| e | P2 | a - c - d |

ONE OF $Q_1$ TO $Q_{10}$ FAILS
IN SHORT MODE $Q_1$ FAILS IN OPEN MODE

| FAILED PHASES | PHASES USED FOR DRIVING |
|---|---|
| a - c | b - d - e |
| a - d | e - c - b |
| b - d | c - e - a |
| b - e | a - c - d |
| c - e | d - a - b |

MOTOR DRIVE SYSTEM, CONTROL METHOD OF MOTOR DRIVE SYSTEM, AND TRAVELING DEVICE

This is a 371 national phase application of PCT/JP2010/000401 filed 25 Jan. 2010, the content of which is incorporated herein by reference.

TECHNICAL FIELD

The present invention relates to a motor drive system, a control method of a motor drive system, and a traveling device.

BACKGROUND ART

In recent years, the development of personal mobility robots that operates by inversion control has been in progress. For example, Patent literature 1 discloses a two-wheeled traveling device that moves while performing inversion control.

In such a personal mobility robot that operates by inversion control, if some part relating to the driving of a motor (electrical component such as a CPU and an inverter) stops functioning properly because of a failure, the robot becomes unstable because of the nature of its control system. Therefore, the system needs to have redundancy.

For example, the traveling device disclosed in Patent literature 1 is configured as shown in FIG. 21 so that the system has redundancy. That is, as shown in the figure, as for motors 510 and 520 that drive wheels, the winding of the motors includes six slots and is configured as double windings each including three slots. Further, each three slots of the doubled winding are driven by one inverter (530, 540). With the configuration like this, if one of the phases fails, one of the inverters is stopped and the motors are driven by the winding including only three slots.

Further, Patent literatures 2 and 3 disclose other configurations to achieve the redundancy of a motor. In Patent literature 2, a switch that connects the high-potential voltage of an inverter that drives a multi-phase motor to a neutral point and a switch that connects the low-potential end to the neutral point are provided, so that when an open fault occurs, the inverter is operated in a half-wave driving mode. Patent literature 3 discloses a configuration in which each semiconductor element of an inverter(s) has redundancy. Further, Patent literatures 4 to 6 disclose techniques that, even when one of the phases fails, enable the motor to continue driving without losing the function as a motor by using three phases.

CITATION LIST

Patent Literature

[Patent Literature 1] U.S. Pat. No. 6,965,206

[Patent Literature 2] Japanese Unexamined Patent Application Publication No. 2009-95170

[Patent Literature 3] Japanese Unexamined Patent Application Publication No. 10-142372

[Patent Literature 4] Japanese Unexamined Patent Application Publication No. 2009-177915

[Patent Literature 5] Japanese Unexamined Patent Application Publication No. 2004-120883

[Patent Literature 6] Japanese Unexamined Patent Application Publication No. 2008-67429

SUMMARY OF INVENTION

Technical Problem

However, since each inverter is simply doubled in the techniques disclosed in Patent literatures 1 and 3, they require twice the original cost in order to make the whole system have redundancy. Further, in the configuration disclosed in Patent literature 1, when one of the phases fails, the output torque is reduced by half.

Further, the techniques disclosed in Patent literatures 2 and 3 can cope with the failure only when the semiconductor switch fails in the open mode. That is, if a fault occurs in a short mode, a return current flows, thus causing braking. Since a failure of semiconductor switches usually occurs in a short mode, the operation becomes unstable unexpectedly because of the occurrence of braking.

Further, as for the techniques disclosed in Patent literatures 4 to 6, the literatures do not disclose, for a motor having five phases or more, any configuration to cope with the switching of phases used to drive the motor when one of the phases fails.

Accordingly, an object of the present invention is to provide a motor drive system capable of avoiding an unstable state with a simple configuration even when a part relating to the driving of a motor (electrical component such as a CPU and an inverter) fails and thereby one of the phases fails, a control method of a motor drive system, and a traveling device.

Solution to Problem

A motor drive system in accordance with the present invention includes: a motor to which a plurality of phase coils of five phases or more are connected in a star connection; an inverter connected to one end of each of the phase coils, the inverter being configured to convert a DC power into an AC power and supply the AC power to each phase of the motor; a power relay disposed at another end of each of the phase coils, the power relay being configured so as to be able to cut off a supply power to at least one phase coil among the plurality of phase coils of the motor by using a plurality of contact points interposed between the star-connected coils; and a control unit that generates a control signal for the inverter and thereby controls driving of the motor, wherein when one or more phase of the motor fails, the control unit opens a contact point of the power relay corresponding to the failed phase and drives three or more phases that are disposed at roughly equal phase-intervals among a plurality of remaining phases.

In this way, even when a part relating to the driving of the motor (electrical component such as a CPU and an inverter) fails and thereby one of the phases fails, it is still possible to continue to drive the motor by using three or more phases among the plurality of remaining phases. Therefore, it is possible to avoid the unstable state with a simple configuration.

Further, the control unit may include a plurality of control units each of which controls driving of three or more phases among a plurality of phases of the motor, so that when one of the plurality of control units fails, a remaining non-failed control unit may continue to control the driving of the motor. In this way, the reliability of the system can be further improved.

Furthermore, the control unit may include first and second control units each of which controls driving of three or more phases including at least one phase that can be controlled by either of the first and second control units among a plurality of phases of the motor, so that when the first control unit fails, the second control unit may continue to control the driving of the motor. In this way, the reliability of the system can be further improved.

A motor drive system in accordance with another aspect of the present invention includes: a motor to which five phase coils are connected in a star connection; an inverter connected to one end of each of the phase coils, the inverter being configured to convert a DC power into an AC power and supply the AC power to each phase of the motor; a power relay disposed at another end of each of the phase coils, the power relay being configured so as to be able to cut off a supply power to one or two phase coil among the five-phase coils of the motor by using a plurality of contact points interposed between the star-connected coils; and a control unit that generates a control signal for the inverter and thereby controls driving of the motor, wherein when one or two phase of the motor fails, the control unit opens a contact point of the power relay corresponding to the failed phase and drives three phases that are disposed at roughly equal phase-intervals among remaining three or four phases.

In this way, even when a part relating to the driving of the motor (electrical component such as a CPU and an inverter) fails and thereby one of the phases fails, it is still possible to continue to drive the motor by using three phases among a plurality of remaining phases. Therefore, it is possible to avoid the unstable state with a simple configuration.

Further, the control unit may include first and second control units each of which controls driving of three phases including at least one phase that can be controlled by either of the first and second control units among the five phases of the motor, so that when the first control unit fails, the second control unit may continue to control the driving of the motor. In this way, the reliability of the system can be further improved.

Furthermore, the motor drive system may include an OR circuit to which a same inverter control signal is input from each of the first and second control units, and an output signal from the OR circuit and inverter control signals for two phases that are output from the second control unit may be input to the inverter. In this way, it is possible to realize a redundant system with a simple circuit configuration.

Further, the motor drive system may include a switch that selects one of same inverter control signals input from the first and second control units respectively according to priorities defined for the first and second control units, and a higher priority may be defined for the first control unit than that for the second control unit. Further, when the first control unit is operating properly, an output signal from the first control unit that is selected by the switch and inverter control signals for two phases that are output from the first control unit may be input to the inverter, whereas when the first control unit fails, an output signal from the second control unit that is selected by the switch and inverter control signals for two phases that are output from the second control unit may be input to the inverter. In this way, it is possible to realize a redundant system with a simple circuit configuration.

A control method of a motor drive system in accordance with the present invention may be a control method of a motor drive system that includes: a motor to which a plurality of phase coils of five phases or more are connected in a star connection; an inverter connected to one end of each of the phase coils, the inverter being configured to convert a DC power into an AC power and supply the AC power to each phase of the motor; and a power relay disposed at another end of each of the phase coils, the power relay being configured so as to be able to cut off a supply power to at least one phase coil among the plurality of phase coils of the motor by using a plurality of contact points interposed between the star-connected coils, wherein when one or more phase of the motor fails, the control method of a motor drive system may open a contact point of the power relay corresponding to the failed phase and drive three or more phases that are disposed at roughly equal phase-intervals among a plurality of remaining phases.

In this way, even when a part relating to the driving of the motor (electrical component such as a CPU and an inverter) fails and thereby one of the phases fails, it is still possible to continue to drive the motor by using three or more phases among the plurality of remaining phases. Therefore, it is possible to avoid the unstable state with a simple configuration.

A traveling device in accordance with the present invention may be a traveling device that performs inversion control by driving a wheel, including: a motor that drives the wheel, the motor being connected to five phase coils in a star connection; an inverter connected to one end of each of the phase coils, the inverter being configured to convert a DC power into an AC power and supply the AC power to each phase of the motor; a power relay disposed at another end of each of the phase coils, the power relay being configured so as to be able to cut off a supply power to one or two phase coil among the five-phase coils of the motor by using a plurality of contact points interposed between the star-connected coils; and a control unit that generates a control signal for the inverter and thereby controls driving of the motor, wherein when one or two phase of the motor fails, the control unit may open a contact point of the power relay corresponding to the failed phase and drive three phases that are disposed at roughly equal phase-intervals among remaining three or four phases.

In this way, even when a part relating to the driving of the motor (electrical component such as a CPU and an inverter) fails and thereby one of the phases fails, it is still possible to continue to drive the motor by using three phases among a plurality of remaining phases. Therefore, it is possible to avoid the unstable state with a simple configuration.

Further, the control unit may include first and second control units each of which controls driving of three phases including at least one phase that can be controlled by either of the first and second control units among the five phases of the motor, so that when the first control unit fails, the second control unit may continue to control the driving of the motor. In this way, the reliability of the system can be further improved.

DESCRIPTION OF EMBODIMENTS

For example, in an apparatus that travels while performing inversion control, its balanced state is maintained by driving a motor(s) that rotates a wheel(s). Therefore, if an electrical component relating to the motor fails and thereby stops operating, the vehicle becomes unstable because it cannot maintain the balanced state, thus posing a risk that the vehicle could tumble down. Consequently, it is strongly desired that the driving of the motor is continued even when one part of an electrical component relating to a motor fails. Accordingly, the present invention adopts, in a motor drive system, such a mechanism that the winding of a motor is configured as a five-phase star connection, for example, and the five-phase motor is driven by vector control. Then, if one or two phases fail, the number of phases of the motor used for the driving is changed from five to three. With this configuration, the winding has redundancy and therefore the system has redundancy.

First Exemplary Embodiment

Exemplary embodiments of the present invention are explained hereinafter with reference to the drawings.

Figure 1:
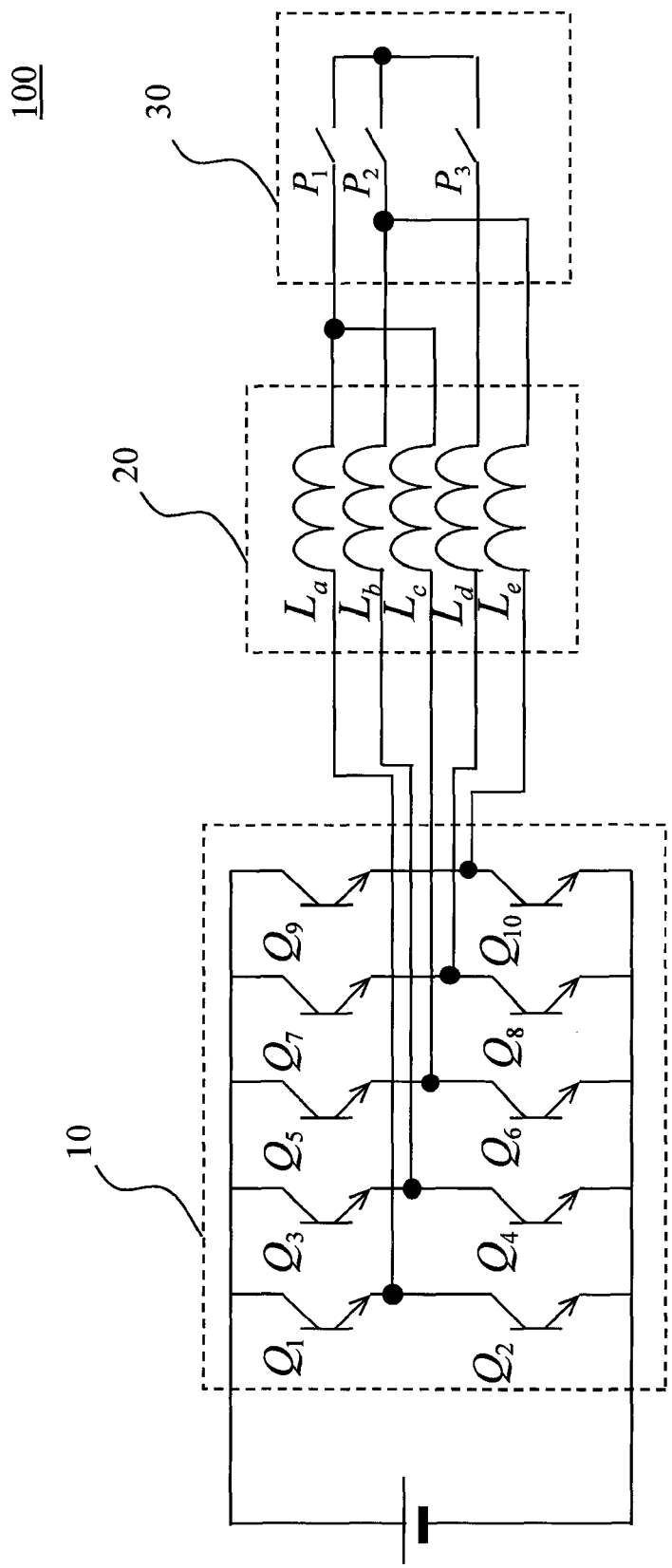
FIG. 1 is a configuration diagram of a motor drive circuit in accordance with a first exemplary embodiment.

FIG. 1 is a configuration diagram of a motor drive circuit in accordance with an exemplary embodiment of the present invention.

A motor drive circuit 100 includes a five-phase inverter 10 to which a DC voltage is directly supplied from a power supply, a five-phase motor 20, and a power relay 30.

The five-phase inverter 10 includes five-phase (a, b, c, d and e) arm circuits. The arm circuits for respective phases are formed from switching elements $Q_1$ to $Q_{10}$. For example, the a-phase arm circuit is formed from the switching elements $Q_1$ and $Q_2$; the b-phase arm circuit is formed from the switching elements $Q_3$ and $Q_4$; the c-phase arm circuit is formed from the switching elements $Q_5$ and $Q_6$; the d-phase arm circuit is formed from the switching elements $Q_7$ and $Q_8$; and the e-phase arm circuit is formed from the switching elements $Q_9$ and $Q_{10}$. The On/Off of the switching elements $Q_1$ to $Q_{10}$ is controlled by switching control signals $S_1$ to $S_{10}$ supplied from a motor drive system 101 (which is described later).

Further, the five-phase inverter 10 performs a bidirectional power conversion from a DC (Direct Current) power to an AC (Alternating Current) power by the On/Off control (switching control) of the switching elements $Q_1$ to $Q_{10}$ in response to the switching control signals $S_1$ to $S_{10}$ supplied from the motor drive system 101 (which is described later).

As for the switching elements, power MOS (Metal Oxide Semiconductor) transistors, IGBTs (Insulated Gate Bipolar Transistors), power bipolar transistors, or the likes may be used.

The five-phase motor 20 is an AC motor including a rotor (not shown) and five-phase coil windings ($L_a$, $L_b$, $L_c$, $L_d$ and $L_e$) provided in a stator. For example, one end of the coil winding $L_a$ is connected to one end of the coil winding $L_c$, and the other end of the coil winding $L_a$ is connected to the a-phase arm of the five-phase inverter 10. As for the five-phase motor 20, various AC motors such as a brushless motor, an induction motor, and a reactance motor may be used.

The power relay 30 includes a plurality of contact points ($P_1$, $P_2$ and $P_3$) that are used to control the power supply to each phase of the five-phase motor 20. These contact points ($P_1$, $P_2$ and $P_3$) are disposed at the other end of each of the coil windings La to Le, and are interposed between the star-connected coils. The power relay 30 opens or closes the contact points ($P_1$, $P_2$ and $P_3$) according to control signals from the motor drive system 101 (which is described later) to control the power supply to each phase of the five-phase motor 20. That is, the power relay 30 is configured in such a manner that a supply power to one or two phases among the five coil windings L of the five-phase motor 20 can be cut off. For example, one end of the contact point $P_1$ is connected to one ends of the coil windings $L_a$ and $L_c$. Further, the other end of the contact point $P_1$ is connected to one ends of the contact points $P_2$ and $P_3$.

Figure 2:
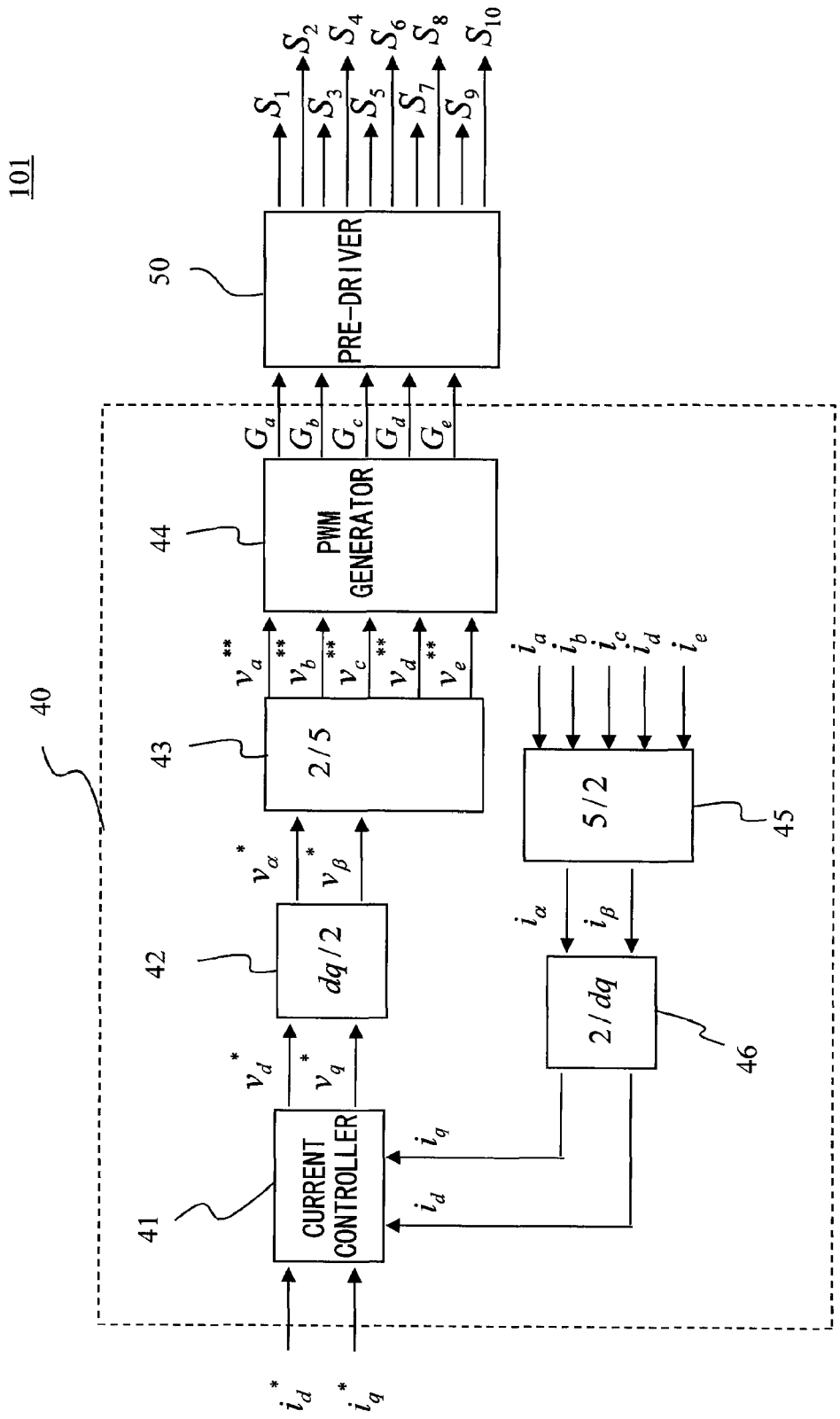
FIG. 2 is a configuration diagram of a motor drive system in accordance with a first exemplary embodiment.

FIG. 2 is a configuration diagram of a motor drive system in accordance with this exemplary embodiment.

The motor drive system 101 includes a control unit 40 and a pre-driver 50.

The motor drive system 101 is connected to the motor drive circuit 100, and outputs switching control signals $S_1$ to $S_{10}$ for the five-phase inverter 10 to the switching elements $Q_1$ to $Q_{10}$. The motor drive system 101 includes a microcomputer (control unit 40), a RAM (Random Access Memory) (not shown), a ROM (Read Only Memory) (not shown), and the like, and generates the switching control signals $S_1$ to $S_{10}$ for the five-phase inverter 10 according to certain program processing so that the five-phase motor 20 operates according to motor reference inputs supplied from an electronic control unit (ECU) at a higher level.

The control unit 40 includes a current controller 41, a dp-axis/two-phase coordinate conversion unit 42, a two-phase/five-phase coordinate conversion unit 43, a PWM generator 44, a five-phase/two-phase coordinate conversion unit 45, and a two-phase/dq-axis coordinate conversion unit 46.

Note that in FIG. 2, $i_d^*$ and $i_q^*$ represent a d-axis current reference input and a q-axis current reference input respectively. Further, $v_d^*$ and $v_q^*$ represent a d-axis voltage reference input and a q-axis voltage reference input respectively. Further, $v_\alpha^*$ and $v_\beta^*$ represent an a-axis voltage reference input and a β-axis voltage reference input respectively. Further, $v_a^*$ to $v_e^*$ represent motor voltage reference inputs for the respective phases of the five-phase motor 20. Further, $G_a$ to $G_e$ represent PWM signals. Further, $S_1$ to $S_{10}$ represent inverter gate signals (switching control signals) for the five-phase inverter 10. Further, $i_a$ to $i_e$ represent motor currents of the respective phases of the five-phase motor 20. Further, $i_\alpha$ and $i_\beta$ represent an α-axis current and a β-axis current respectively. Further, $i_d$ and $i_q$ represent a d-axis current and a q-axis current respectively.

An equivalent-circuit equation of the five-phase motor 20 shown in FIG. 1 is shown below as Expressions (1) to (3). Note that Expression (1) is a circuit equation; Expressions (2) are induced-voltage equations; and Expression (3) is a torque equation. Further, $v_a$, $v_b$, $v_c$, $v_d$ and $v_e$ represent armature voltages of the phases a, b, c, d and e respectively. Further, $i_a$, $i_b$, $i_c$, $i_d$ and $i_e$ represent armature currents of the phases a, b, c, d and e respectively. Further, $e_a$, $e_b$, $e_c$, $e_d$ and $e_e$ represent induced voltages of the phases a, b, c, d and e respectively. Further, R and L represent a resistance and a self-inductance, respectively, of the motor winding. Further, p represents a differential operator. Further, $\omega_{re}$ and $\theta_{re}$ represents an armature angular speed and an armature angle, respectively, of the motor. Further, $\Phi_{fa}$ represents the maximum value for the armature winding flux linkage value of the motor. Further, $T_e$ represents a motor torque and P represents the number of pole pairs.

[Expression 1]

$$\begin{bmatrix} v_a \\ v_b \\ v_c \\ v_d \\ v_e \end{bmatrix} = \begin{bmatrix} R+pL & -\frac{1}{2}pM & 0 & 0 & -\frac{1}{2}pM \\ -\frac{1}{2}pM & R+pL & -\frac{1}{2}pM & 0 & 0 \\ 0 & -\frac{1}{2}pM & R+pM & -\frac{1}{2}pM & 0 \\ 0 & 0 & -\frac{1}{2}pM & R+pL & -\frac{1}{2}pM \\ -\frac{1}{2}pM & 0 & 0 & -\frac{1}{2}pM & R+pL \end{bmatrix} \begin{bmatrix} i_a \\ i_b \\ i_c \\ i_d \\ i_e \end{bmatrix} + \begin{bmatrix} e_a \\ e_b \\ e_c \\ e_d \\ e_e \end{bmatrix} \quad (1)$$

[Expression 2]

$$e_a = -\omega_{re}\Phi_{fa}\sin(\theta_{re}) \quad (2)$$

$$e_b = -\omega_{re}\Phi_{fa}\sin\left(\theta_{re} - \frac{2}{5}\pi\right)$$

$$e_c = -\omega_{re}\Phi_{fa}\sin\left(\theta_{re} - \frac{4}{5}\pi\right)$$

$$e_d = -\omega_{re}\Phi_{fa}\sin\left(\theta_{re} - \frac{6}{5}\pi\right)$$

$$e_e = -\omega_{re}\Phi_{fa}\sin\left(\theta_{re} - \frac{8}{5}\pi\right)$$

[Expression 3]

$$T_e = P\Phi_{fa}\left(-i_a\sin(\theta_{re}) - i_b\sin\left(\theta_{re} - \frac{2}{5}\pi\right) - i_c\sin\left(\theta_{re} - \frac{4}{5}\pi\right) - i_d\sin\left(\theta_{re} - \frac{6}{5}\pi\right) - i_e\sin\left(\theta_{re} - \frac{8}{5}\pi\right)\right) \quad (3)$$

Referring to FIG. 2 again, the exemplary embodiment is further explained.

After the current reference inputs $i_d^*$ and $i_q^*$ of the d and q axes are given, the current controller 41 performs current control according to their deviations from the calculated current $i_d$ and $i_q$ of the d and q axes. Upon receiving the current reference inputs $i_d^*$ and $i_q^*$ of the d and q axes, the current controller 41 outputs voltage reference inputs $v_d^*$ and $v_q^*$ of the d and q axes. Note that the current reference inputs $i_d^*$ and $i_q^*$ of the d and q axes are output from a motor driver(s) (not shown). That is, the motor driver (not shown) generates current reference inputs $i_d^*$ and $i_q^*$ of the d and q axes according to the speed reference input of the wheel.

The dp-axis/two-phase coordinate conversion unit 42 converts voltage reference inputs $v_d^*$ and $v_q^*$ of the d and q axes into two-phase fixed coordinates by using a well-known dq-coordinate conversion formula (4) shown below. In this way, the dp-axis/two-phase coordinate conversion unit 42 outputs voltage reference inputs $v_\alpha^*$ and $v_\beta^*$ of the α and β axes.

[Expression 4]

$$\begin{bmatrix} \cos\theta_{re} & -\sin\theta_{re} \\ \sin\theta_{re} & \cos\theta_{re} \end{bmatrix} \quad (4)$$

The two-phase/five-phase coordinate conversion unit 43 converts voltage reference inputs $v_\alpha^*$ and $v_\beta^*$ expressed as two-phase fixed coordinates from the two-phase fixed coordinates into expressions of five-phase fixed coordinates by using a conversion formula (5) shown below. In this way, the two-phase/five-phase coordinate conversion unit 43 outputs motor voltage reference inputs $v_a^{}$ to $v_e^{}$ of the respective phases of the five-phase motor 20.

[Expression 5]

$$c_{2/5} = \begin{bmatrix} 1 & 0 \\ \cos\left(\frac{2}{5}\pi\right) & \sin\left(\frac{2}{5}\pi\right) \\ -\cos\left(\frac{1}{5}\pi\right) & \sin\left(\frac{1}{5}\pi\right) \\ -\cos\left(\frac{1}{5}\pi\right) & -\sin\left(\frac{1}{5}\pi\right) \\ \cos\left(\frac{2}{5}\pi\right) & -\sin\left(\frac{2}{5}\pi\right) \end{bmatrix} \quad (5)$$

The PWM generator 44 generates PWM signals $G_a$ to $G_e$ based on the motor voltage reference inputs $v_a^{}$ to $v_e^{}$ of the respective phases.

The five-phase/two-phase coordinate conversion unit 45 can convert five-phase fixed coordinates into two-phase fixed coordinates by using a conversion formula (6) shown below in a similar manner to the above-described conversion. In this way, the five-phase/two-phase coordinate conversion unit 45 outputs currents $i_\alpha$ and $i_\beta$ of the α and β axes.

[Expression 6]

$$c_{5/2} = \begin{bmatrix} 1 & \cos\left(\frac{2}{5}\pi\right) & -\cos\left(\frac{1}{5}\pi\right) & -\cos\left(\frac{1}{5}\pi\right) & \cos\left(\frac{2}{5}\pi\right) \\ 0 & \sin\left(\frac{2}{5}\pi\right) & \sin\left(\frac{1}{5}\pi\right) & -\sin\left(\frac{1}{5}\pi\right) & -\sin\left(\frac{2}{5}\pi\right) \end{bmatrix} \quad (6)$$

Then, the two-phase/dq-axis coordinate conversion unit 46 converts the currents $i_\alpha$ and $i_\beta$ of the α and β axes into currents $i_d$ and $i_q$ of the d and q axes. In this way, currents $i_a$ to $i_e$ detected in the respective phases of the five-phase motor 20 are fed back, and by doing so, feedback control is performed for the current control. Therefore, by performing the above-described conversions, even the five-phase motor 20 can be controlled by applying an ordinary vector control theory.

The pre-driver 50 generates inverter gate signals $S_1$ to $S_{10}$ of the five-phase inverter 10 based on the PWM signals $G_a$ to $G_e$. The pre-driver 50 is a circuit that charges/discharges a gate capacitance swiftly for a PWM signal having a logic level output from the control unit 40. In order to perform high-speed switching of a power MOS-FET, which serves as a switching element Q, it is necessary to perform high-speed charging/discharging for the input capacitance of the MOS FET gate. To that end, the pre-driver 50 is provided between the control unit 40 and the five-phase inverter 10.

Further, in the case of a MOS-FET using a three-phase or five-phase top-and-bottom bridge configuration and in which the MOS-FET of the top arm has an N-channel, it is necessary to provide a voltage higher than the output voltage by the gate on-voltage in order to perform the switching. Therefore, a charge-pump method or a bootstrap method is used for the operation of the top arm.

Figure 3:
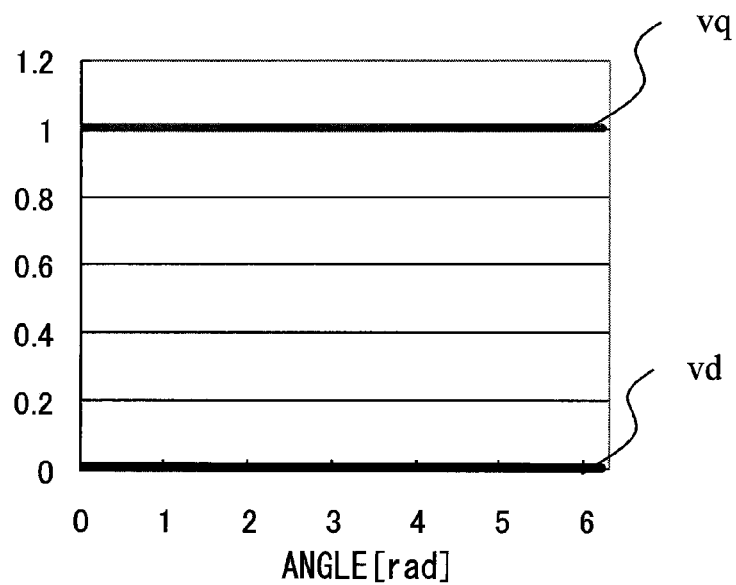
FIG. 3 is a graph showing an example of change of a voltage reference input in a motor drive system in accordance with a first exemplary embodiment.
Figure 4:
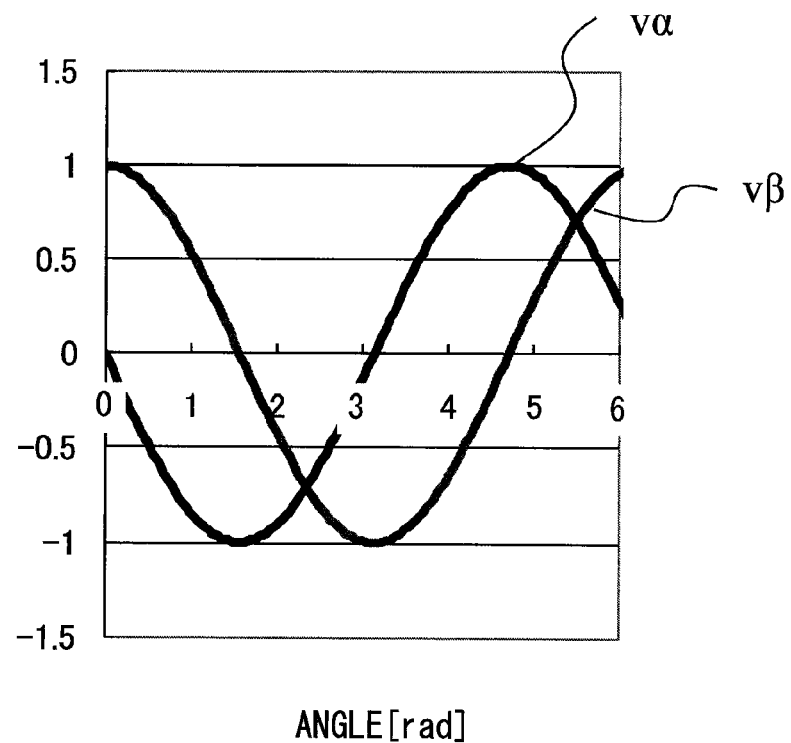
FIG. 4 is a graph showing an example of change of a voltage reference input in a motor drive system in accordance with a first exemplary embodiment.
Figures 5, 6:
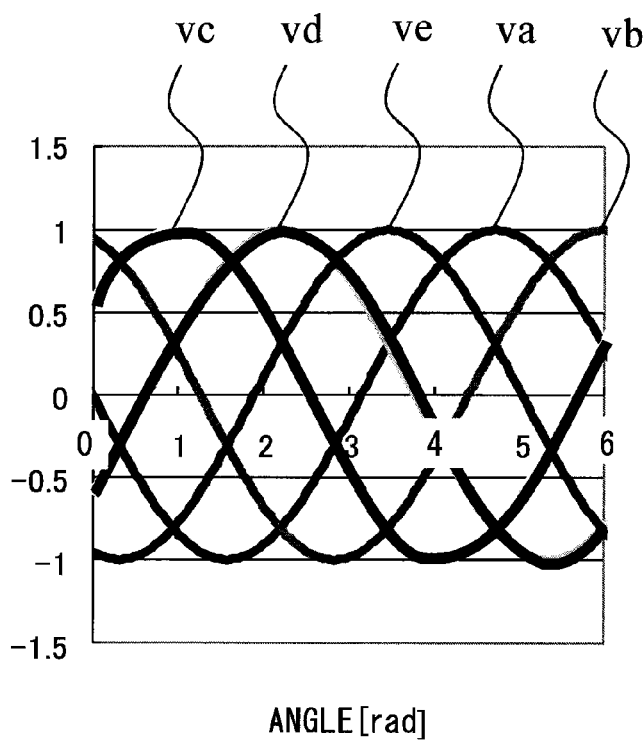
FIG. 5 is a graph showing an example of change of a voltage reference input in a motor drive system in accordance with a first exemplary embodiment.
FIG. 6 is a table showing combinations of a failed phase of a motor and phases used to drive the motor in accordance with a first exemplary embodiment.

FIGS. 3, 4 and 5 show examples of values obtained after each axis conversion on the assumption that the d-axis voltage reference input $v_d^*$ is zero and q-axis voltage reference input $v_q^*$ is one. FIG. 3 shows changes of d-q axis voltage reference inputs. FIG. 4 shows changes of α-β axis voltage reference inputs. FIG. 5 shows changes of five-phase voltage reference inputs.

Next, a phase switching operation performed by the drive system 101 in a case where one phase of the five-phase motor 20 fails is explained. The motor drive system 101 includes fault detection means to detect a fault in the switching elements $Q_1$ to $Q_{10}$, and generates control signals for the power relay 30 according to the detection. That is, the fault detection means detects a fault that occurs at any place from the switching elements $Q_1$ to $Q_{10}$ constituting the respective phases of the five-phase inverter 10 to the five-phase motor 20. The motor drive system 101 uses the power relay 30 as disconnection means, and when a fault is detected by the fault detection means, cuts off a power supply to the phase in which the fault is detected.

For example, if one of the switching elements $Q_1$ to $Q_{10}$ of the five-phase inverter 10 fails in a short mode, the motor drive system 101 disconnects the failed phase by using the power relay 30. For example, the connection between each contact point P of the power relay 30 and each winding coil L of the five-phase motor 20 is configured as shown in FIG. 1. Then, according to which of the switching elements $Q_1$ to $Q_{10}$ the fault is detected, the contact point $P_1$, $P_2$ or $P_3$ corresponding to the faulty switching element is opened.

FIG. 6 shows combinations of a failed phase and the phases used for the driving in the configuration shown in FIG. 1. For example, if the b-phase fails, the contact point $P_2$ of the power relay 30 is opened. As a result, power supply to the winding coils $L_b$ and $L_e$ of the five-phase motor 20 is cut off, and the motor drive system 101 uses the phases c, d and a among the remaining three phases to continue to drive the five-phase motor 20. Note that when one phase fails, the combination of the three phases that are used for the driving among a plurality of remaining phases is determined so that the phase-intervals among these three phases become roughly equal to each other. This combination is determined based on the failed phase and the configuration of the power relay 30.

If one of the switching elements $Q_1$ to $Q_{10}$ fails in a short mode, a return current could occur and cause braking. To avoid the situation like this, it is necessary to open a winding coil corresponding to the faulty place among the five winding coils of the five-phase motor 20. As a configuration to open the winding coil corresponding to the faulty place and to switch the phases used to drive the motor to desired phases, the configuration of the power relay 30 shown in FIG. 1, for example, can be used. In this way, the number of the contact points P of the power relay 30 can be reduced to three, and therefore it is possible to achieve the switching of the phases that are used to continue the driving of the motor with the minimum configuration.

As for the fault detection method for detecting a part relating to the driving of the motor (electrical component such as a CPU and an inverter) performed by the motor drive system 101, publicly-known techniques can be used. For example, a fault in the switching elements $Q_1$ to $Q_{10}$ can be detected by using the following technique.

A fault detection method of the switching elements $Q_1$ to $Q_{10}$ is explained with reference to FIGS. 7 to 9.

Figure 7:
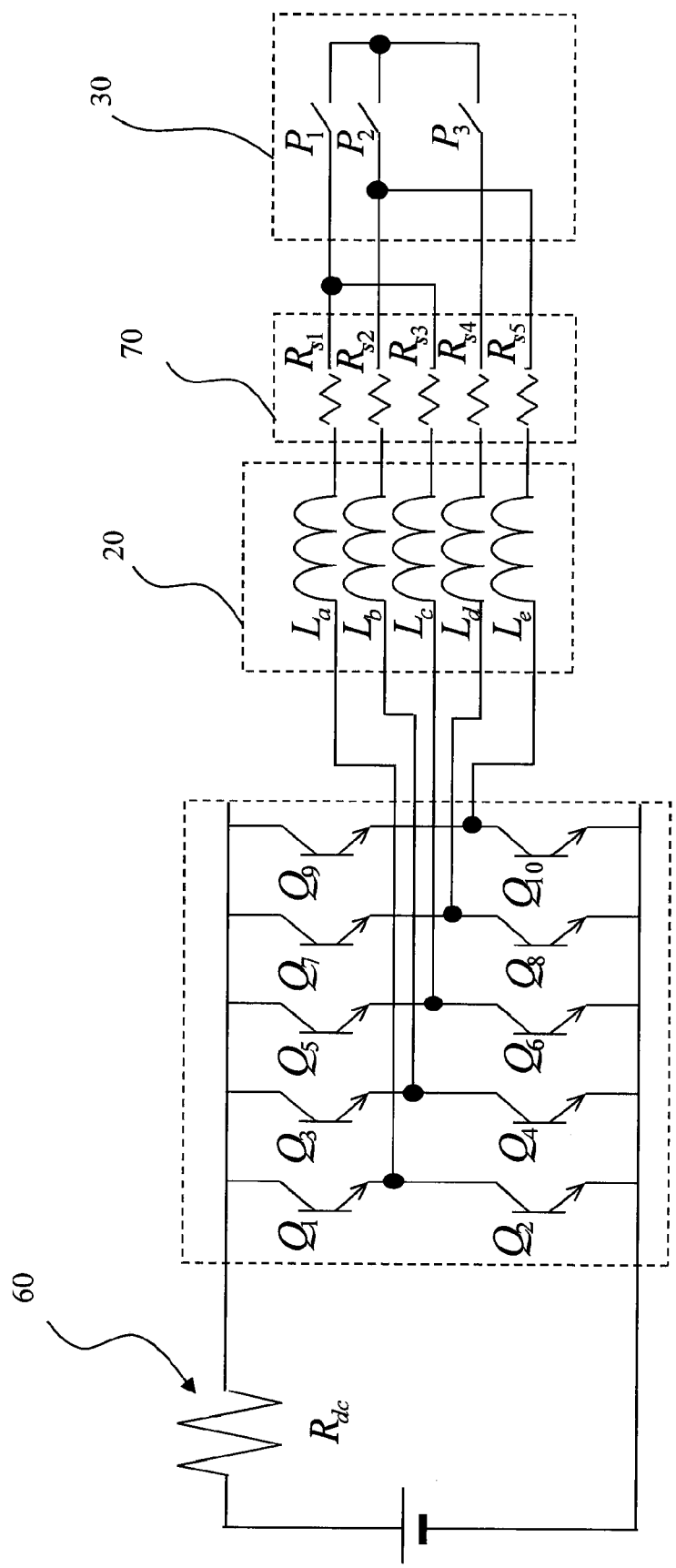
FIG. 7 is a configuration diagram of a motor drive system for detecting a fault in accordance with a first exemplary embodiment.

For example, as shown in FIG. 7, shunt resistors 60 and 70 are provided in the motor drive circuit 100 shown in FIG. 1. That is, the shunt resistor 60 ($R_{dc}$) is connected in series between the power supply and the five-phase inverter 10. Further, the shunt resistors 70 are provided between the five-phase motor 20 and the power relay 30. Each of resistors $R_{s1}$ to $R_{s5}$ of the shunt resistors 70 is connected to one of the winding coils $L_a$ to $L_e$ of the five-phase motor 20.

Figure 8:
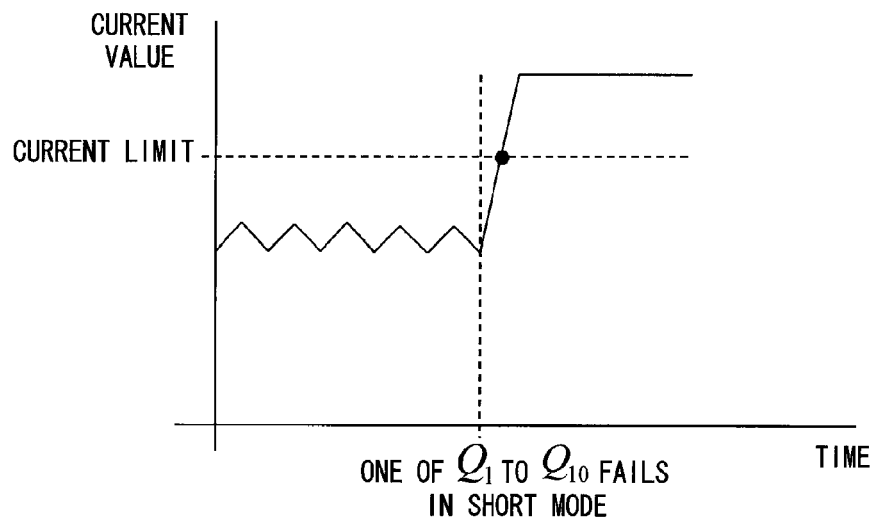
FIG. 8 is a graph for explaining a fault detection method in accordance with a first exemplary embodiment.

FIG. 8 shows change in the current value detected at the resistor 60 ($R_{dc}$). When one of the switching elements $Q_1$ to $Q_{10}$ fails in a short mode, the current value detected at the resistor 60 ($R_{dc}$) exceeds a predetermined threshold (current limit). Therefore, the motor drive system 101 determines that one of the switching elements $Q_1$ to $Q_{10}$ has failed when the current value detected at the resistor 60 ($R_{dc}$) exceeds the predetermined threshold.

Figure 9:
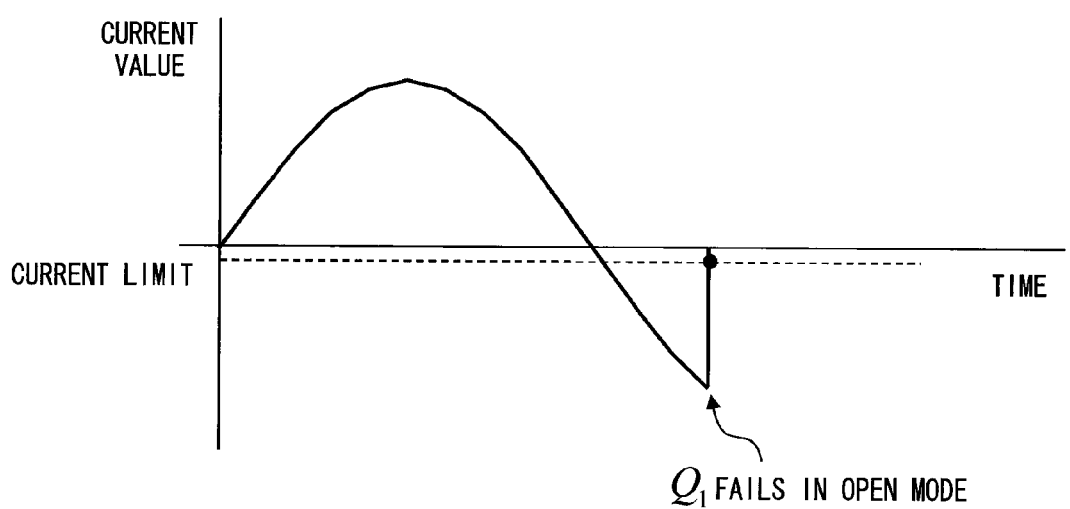
FIG. 9 is a graph for explaining a fault detection method in accordance with a first exemplary embodiment.

FIG. 9 shows change in the current value detected at the resistor ($R_{s1}$) of the shunt resistors 70. For example, when the switching element $Q_1$ fails in an open mode, the current value detected at the resistor ($R_{s1}$) of the shunt resistors 70 exceeds a predetermined threshold (current limit). Therefore, the motor drive system 101 determines that the switching element Q1 has failed when the current value detected at the resistor ($R_{s1}$) of the shunt resistors 70 exceeds the predetermined threshold.

As described above, even when one of the five phases of the five-phase motor 20 fails, the motor drive system 101 can continue the driving by using three of the remaining phases. Note that the configuration of the power relay 30 is not limited to the configuration shown in FIGS. 1 and 2. A configuration in which a power relay is provided for each phase of the five-phase motor 20 may by also used. That is, a configuration in which, for a failed switching element Q, only one contact point connected to the corresponding winding coil is opened may be also used.

An example of a configuration in which a power relay is provided for each phase of the five-phase motor 20 and a motor driving method that is used in the configuration when one of the five phases of the five-phase motor 20 fails are explained hereinafter.

Figures 10, 11:
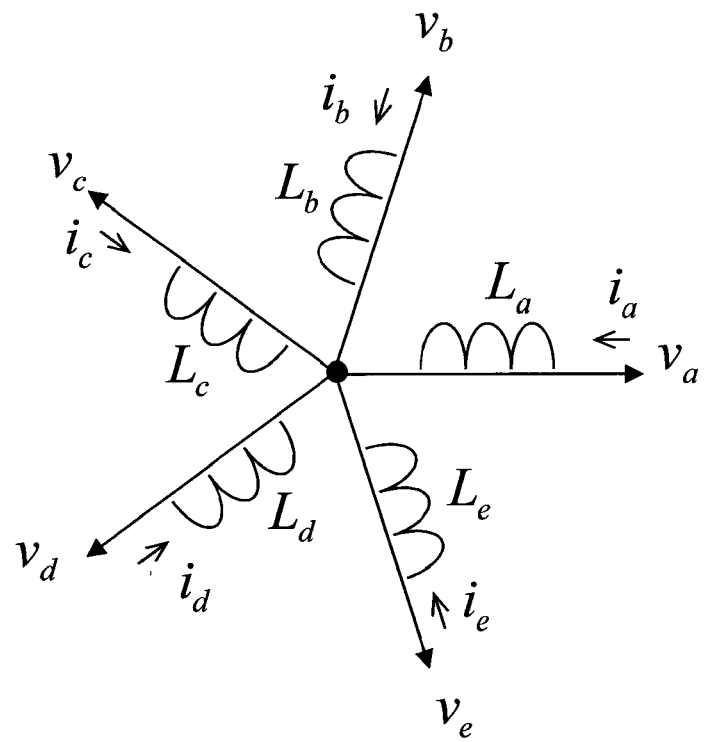
FIG. 10 shows an equivalent circuit of a motor in accordance with a first exemplary embodiment.
FIG. 11 is a table showing combinations of a failed phase of a motor and phases used to drive the motor in accordance with a first exemplary embodiment.

FIG. 10 is an equivalent circuit diagram of the five-phase motor 20.

For example, when either the switching element $Q_3$ or $Q_4$ of the five-phase inverter 10 fails, the armature voltage vb of the b-phase of the five-phase motor 20 cannot be output after that. Therefore, the motor drive system 101 uses three phases, e.g., phases a, c and d among the remaining four phases in order to continue to drive the five-phase motor 20.

In this case, the conversion matrix is expressed as Expression (7) shown below.

[Expression 7]

$$c_{2/5} = \begin{bmatrix} 1 & 0 & -\cos\left(\frac{1}{5}\pi\right) & -\cos\left(\frac{1}{5}\pi\right) & 0 \\ 0 & 0 & \sin\left(\frac{1}{5}\pi\right) & -\sin\left(\frac{1}{5}\pi\right) & 0 \end{bmatrix} \quad (7)$$

Further, a case where a power relay is provided for each phase of the five-phase motor 20 and where two of the five phases of the five-phase inverter 10 fail is explained.

Even when two phases consisting of one phase and another phase having a phase-difference of 144° with respect to the one phase fail, the motor drive system 101 can continue to drive the motor by using the remaining three phases.

FIG. 11 shows combinations of failed two phases and other phases used for the driving. For example, when the phases a and c fail, the driving of the motor is continued by using the phases b, d and e.

Second Exemplary Embodiment

Next, a second exemplary embodiment in accordance with the present invention is explained. When compared to the first exemplary embodiment, the operation of the second exemplary embodiment is fundamentally similar to that of the first exemplary embodiment. However, the second exemplary embodiment is different from the first exemplary embodiment in that the five-phase inverter 10, the five-phase motor 20, and the power relay 30 are controlled by using two control units (CPU1 and CPU2). With this configuration, even if one of the control units fails, the driving of the motor can be continued by using three of the five phases, thus improving the reliability of the system even further. Accordingly, the following explanation is made with a particular emphasis on the configuration/operation that are different from those of the first exemplary embodiment, and the detailed explanation of other configuration/operation that are similar to those of the above-described first exemplary embodiment is omitted.

Figure 12:
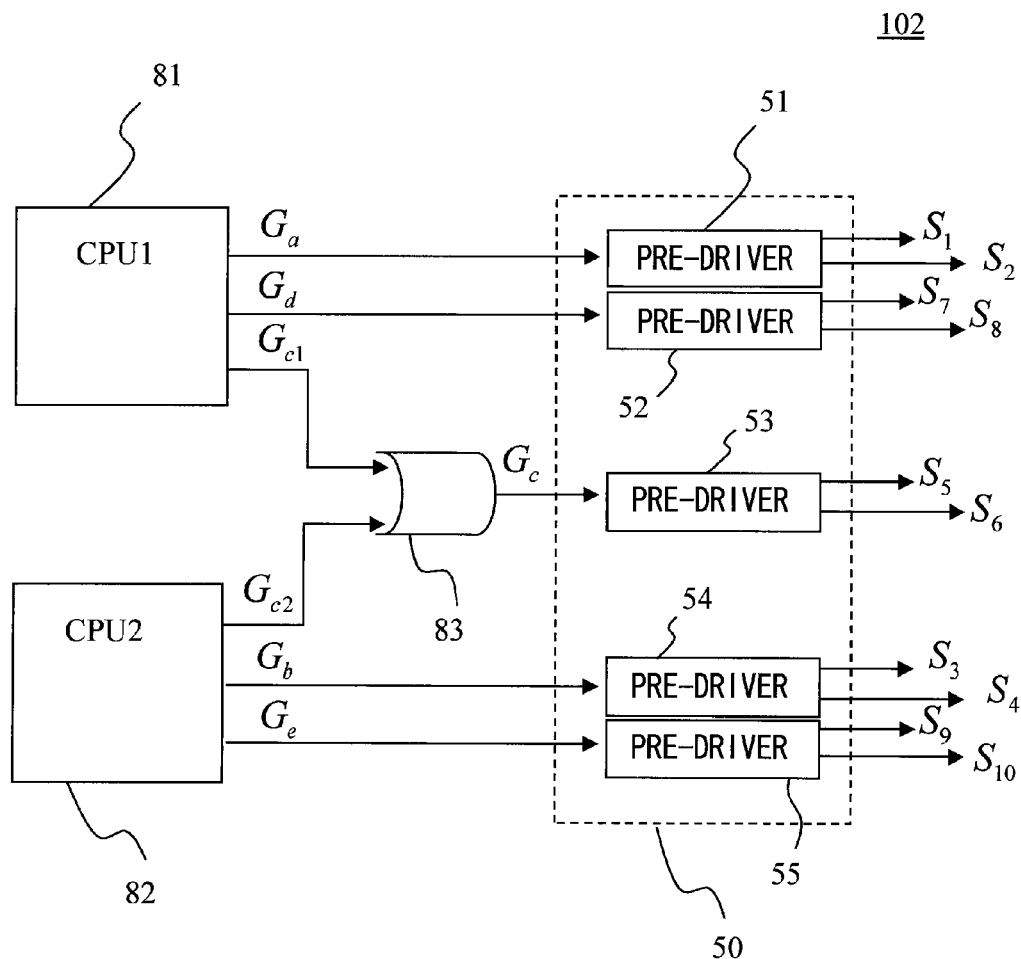
FIG. 12 is a configuration diagram of a motor drive system in accordance with a second exemplary embodiment.

FIG. 12 is a configuration diagram of a motor drive system in accordance with this exemplary embodiment.

A motor drive system 102 includes a control unit 81, a control unit 82, an OR circuit 83, and a pre-driver 50 Note that the configuration/operation of the pre-driver 50 are similar to those of the above-described first exemplary embodiment, and therefore their detailed explanation is omitted.

The motor drive system 102 generates control signals $S_1$ to $S_{10}$ for the five-phase inverter 10 according to certain program processing so that the five-phase motor 20 operates according to motor reference inputs supplied from an electronic control unit (ECU) at a higher level.

Further, the motor drive system 102 detects a fault in the switching elements $Q_1$ to $Q_{10}$ and generates control signals for the power relay 30 according to the detection.

PWM signals $G_a$ and $G_d$ output from the control unit 81 are input to pre-drivers 51 and 52 respectively. The pre-driver 51 generates inverter gate signals $S_1$ and $S_2$ from the PWM signal $G_a$. The pre-driver 52 generates inverter gate signals $S_7$ and $S_8$ from the PWM signal $G_d$.

PWM signals $G_b$ and $G_e$ output from the control unit 82 are input to pre-drivers 54 and 55 respectively. The pre-driver 54 and 55 generate inverter gate signals $S_3$ and $S_4$, and inverter gate signals S9 and S10 from the PWM signals $G_b$ and $G_e$ respectively.

A PWM signal $G_{c1}$ output from the control unit 81 and a PWM signal $G_{c2}$ output from the control unit 82 are input to the OR circuit 83. The output signal $G_c$ of the OR circuit 83 is input to a pre-driver 53. The pre-driver 53 generates inverter gate signals S5 and S6 from the signal $G_c$.

As described above, this exemplary embodiment includes the two control units 81 and 82 and the OR circuit 83 to which output signals from these control units are input, and in which common inverter gate signals used to control one certain phase are obtained from these two control units 81 and 82. In this way, even if one of the control units fails, the motor driving control using three phases can be continued by using the other control unit alone. For example, if the control unit 82 fails, only the control unit 81 can continue to operate. Therefore, the driving of the motor can be continued by using three phases consisting of the phases a, b and c based on the PWM signals $G_a$, $G_d$ and $G_{c1}$.

Figure 13:
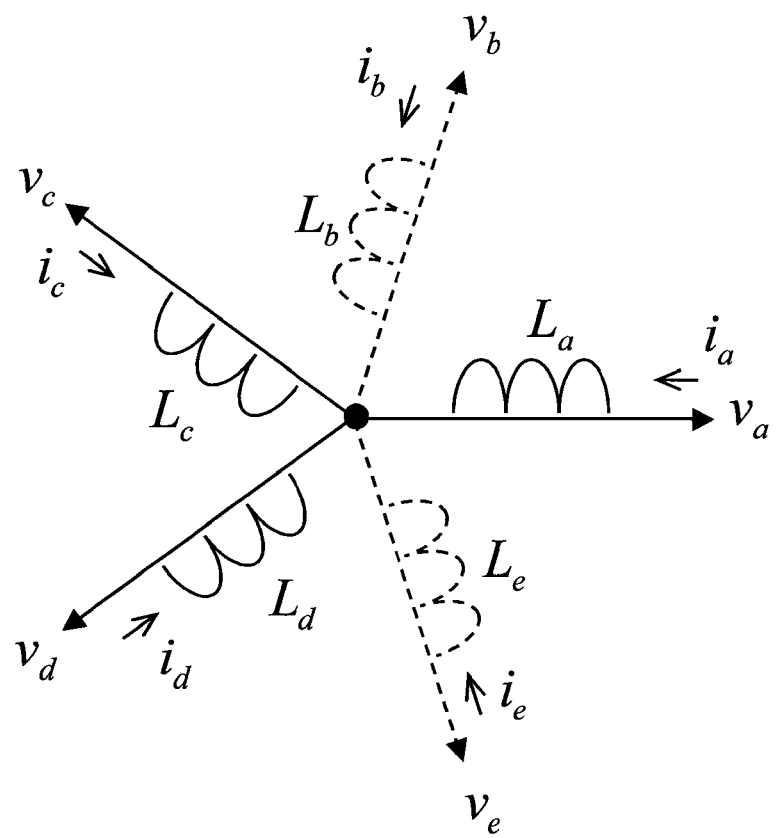
FIG. 13 shows an equivalent circuit of a motor in accordance with a second exemplary embodiment.

FIG. 13 shows an equivalent circuit diagram of the five-phase motor 20 when the control unit 82 fails.

Figure 14:
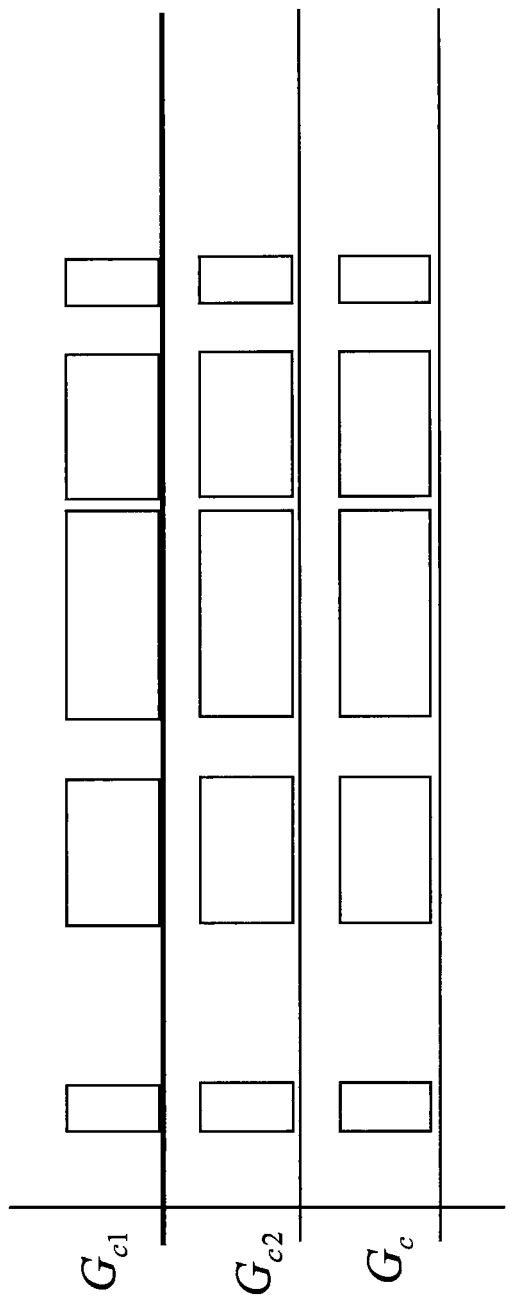
FIG. 14 is a waveform diagram of gate signal in a normal state in accordance with a second exemplary embodiment.

FIG. 14 shows a waveform of each gate signal relating to the c-phase in a normal state. When the control units 81 and 82 are both operating properly, the PWM signals $G_{c1}$ and $G_{c2}$ output from the control units 81 and 82 respectively have the same waveform. Further, the output signal $G_c$ of the OR circuit 83, which is the logical sum of these signals, has also the same waveform.

Figure 15:
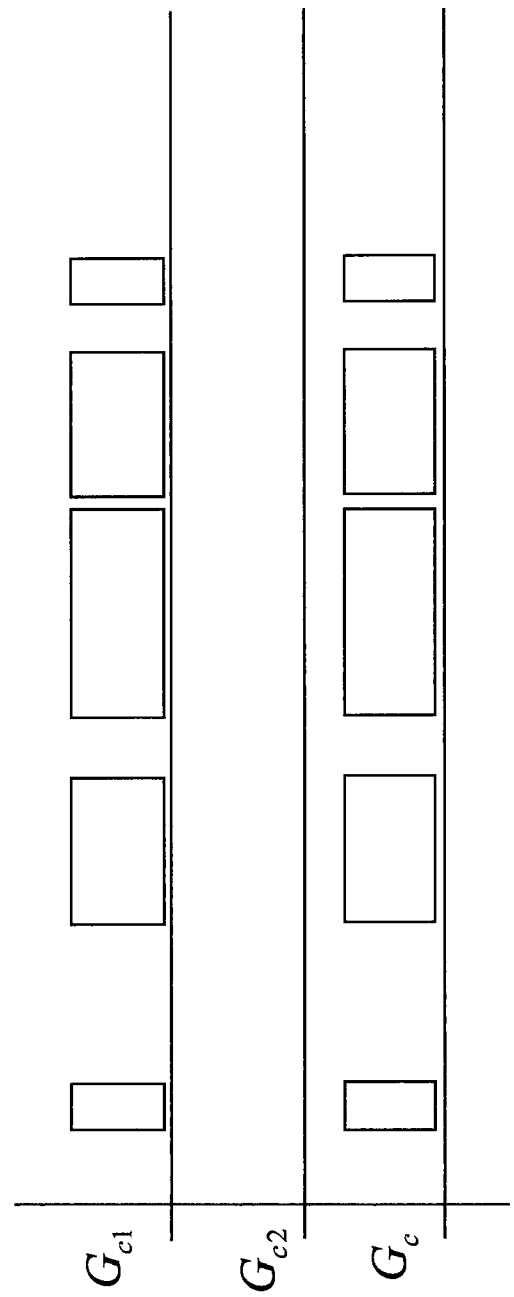
FIG. 15 is a waveform diagram of gate signal in an abnormal state in accordance with a second exemplary embodiment.

FIG. 15 shows a waveform of each gate signal relating to the c-phase in an abnormal state. For example, when only the control unit 82 fails and the control unit 81 is operating properly, the PWM signal $G_{c2}$ from the failed control unit 82 is constantly at a low level. In this case, as the logical-sum signal $G_c$ of the PWM signals $G_{c1}$ and $G_{c2}$, the reference input of the control unit 81, which is operating properly, is output. Note that in this example, the control unit is configured so that when the control unit fails, it constantly outputs a low-level signal.

Figure 16:
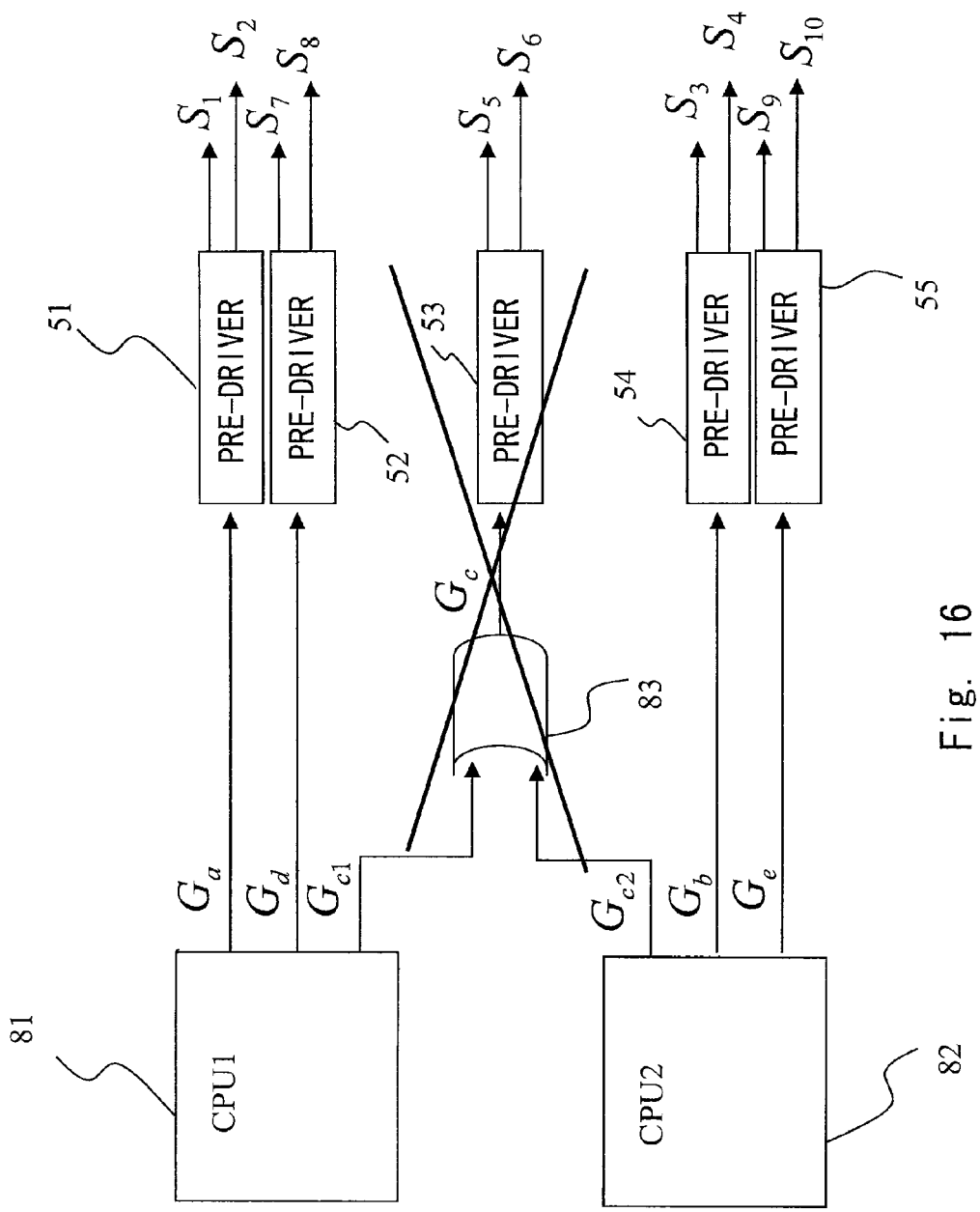
FIG. 16 is a diagram for explaining a faulty place in a motor drive system in accordance with a second exemplary embodiment.
Figure 17:
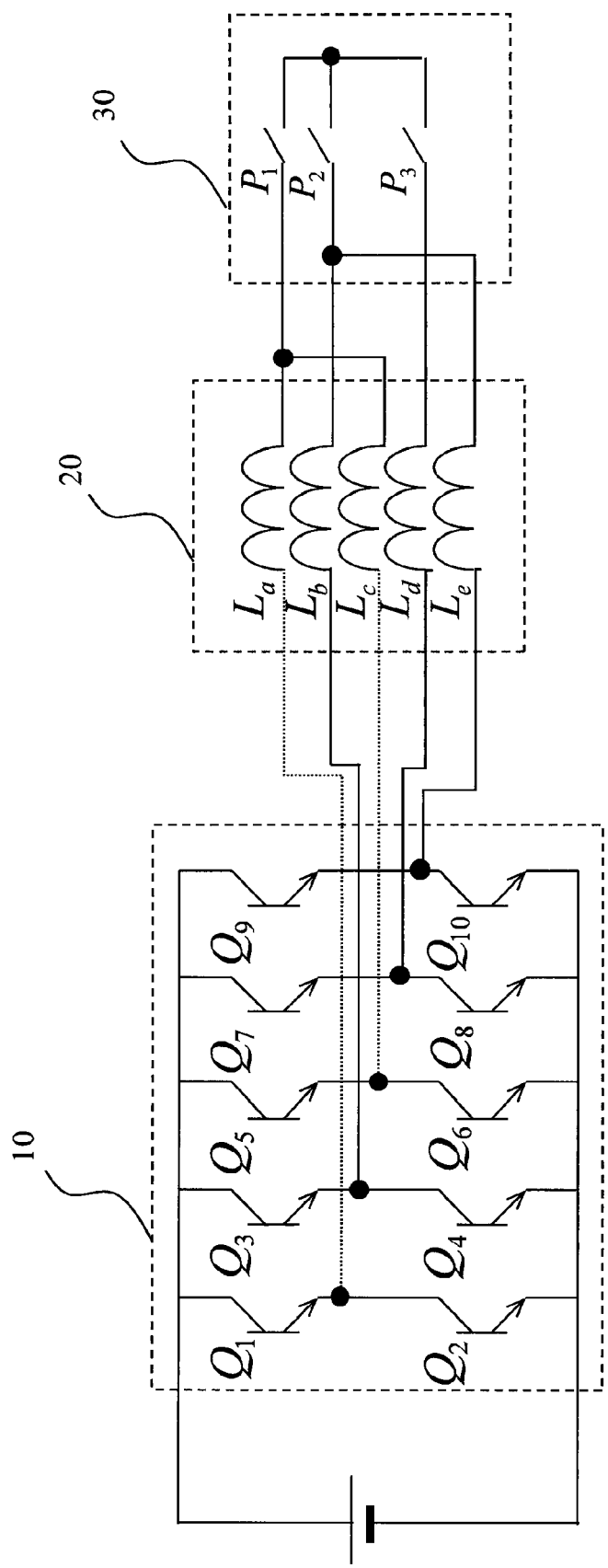
FIG. 17 is a diagram for explaining a faulty place in a motor drive system in accordance with a second exemplary embodiment.
Figure 18:
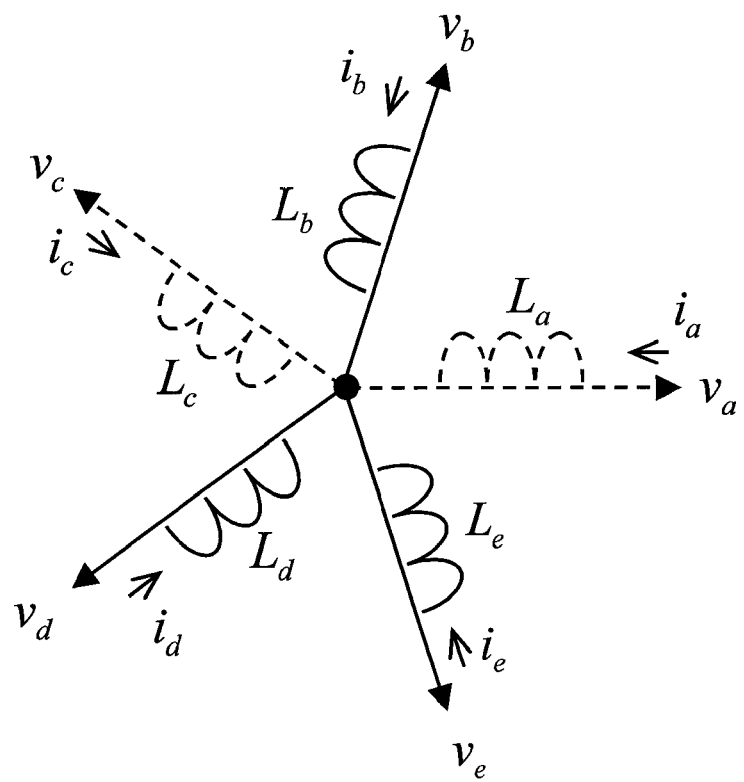
FIG. 18 is a figure for explaining change in an equivalent circuit of a motor in accordance with a second exemplary embodiment.

Note that as shown in FIG. 16, for example, when either the OR circuit 83 or the pre-driver 53 fails, the driving of the motor may be continued by using three of the remaining four phases. That is, the driving of the motor may be continued by using three phases among the inverter gate signals $S_1$, $S_2$, $S_3$ and $S_4$ from the control unit 81, which is operating properly, and the inverter gate signals $S_7$, $S_8$, $S_9$ and $S_{10}$ from the control unit 82, which is also operating properly. For example, as shown in an equivalent circuit of FIG. 17 and a drive circuit of FIG. 18, the driving of the motor can be continued by using the phases b, d and e.

Third Exemplary Embodiment

Figure 19:
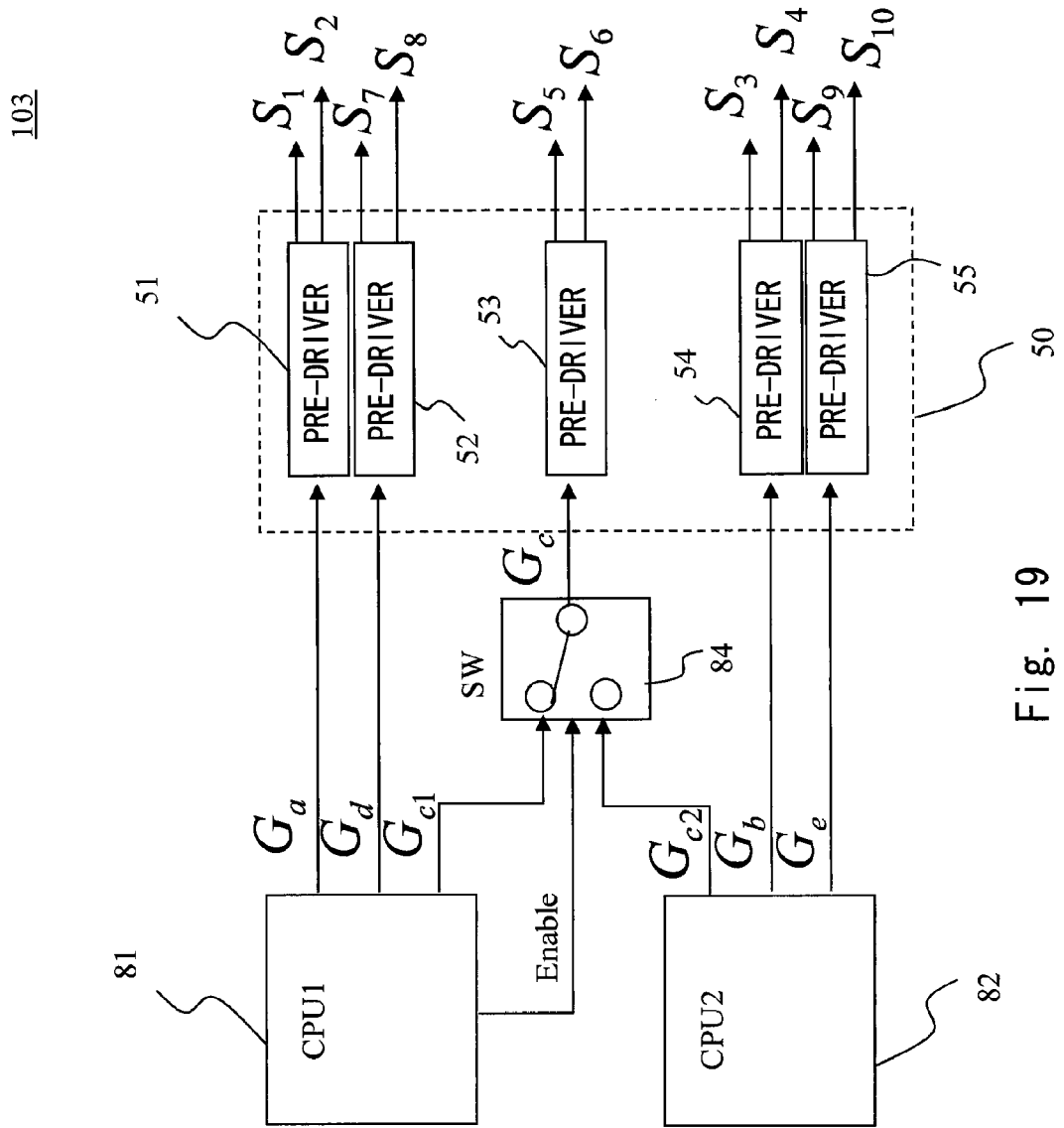
FIG. 19 is a configuration diagram of a motor drive system in accordance with a third exemplary embodiment.

Next, a third exemplary embodiment in accordance with the present invention is explained. In comparison to the second exemplary embodiment, the third exemplary embodiment includes a switch 84 (SW) in place of the OR circuit as shown in FIG. 19. The motor drive system 102 switches the switch 84 according to a failure of the control unit 81 or 82, so that the signal output from the normal control unit is output to the pre-driver 53.

Various switching techniques can be used as the switching method of the switch 84. For example, priorities are defined for the control units 81 and 82. Then, the switch 84 selects a signal from a control unit having a higher priority based on an enable signal that is set according to the priorities. When a control unit having a higher priority fails, the output level of the enable signal is changed. Therefore, the switch 84 is switched so that a signal from the other control unit is received.

Fourth Exemplary Embodiment

Next, a fourth exemplary embodiment in accordance with the present invention is explained. In a fourth exemplary embodiment, an example where a motor drive system in accordance with the above-described exemplary embodiments is applied to a traveling device is explained. Note that the configurations of the five-phase inverter, the five-phase motor, the power relay, the motor drive system, and the like are same as those of the above-described exemplary embodiments, and therefore their detailed explanation is omitted in the following explanation.

Although the traveling device is applied to a coaxial two-wheeled vehicle on which a rider rides in a standing posture, the present invention is not limited to this example. For example, the present invention can be applied to a wheelchair-type vehicle. That is, the present invention can be applied to any vehicle that performs inversion control. The traveling device includes a vehicle main body, left and right driving wheels, wheel drive units that drive the respective left and right driving wheels, and a control device. Steps on which a passenger gets on are provided on the upper surface of the vehicle main body. In each of the left and right driving wheels, a wheel speed sensor that detects the wheel speed of the driving wheel is provided. Each of the wheel speed sensor supplies the detected wheel speed of the driving wheel to the control device.

The wheel drive units are housed in the vehicle main body. The wheel drive units can rotationally drive the pair of driving wheels independently of each other. Each of the wheel drive units is constructed, for example, from a wheel drive motor and a reduction gear(s) that are coupled to the rotation shafts of the wheel drive motor so that the power can be transmitted therethrough. Further, an inclination sensor that detects the inclination angle of the vehicle main body and the passenger, and a control device that outputs control signals used to control the driving of the pair of wheel drive units are provided in the vehicle main body.

Figure 20:
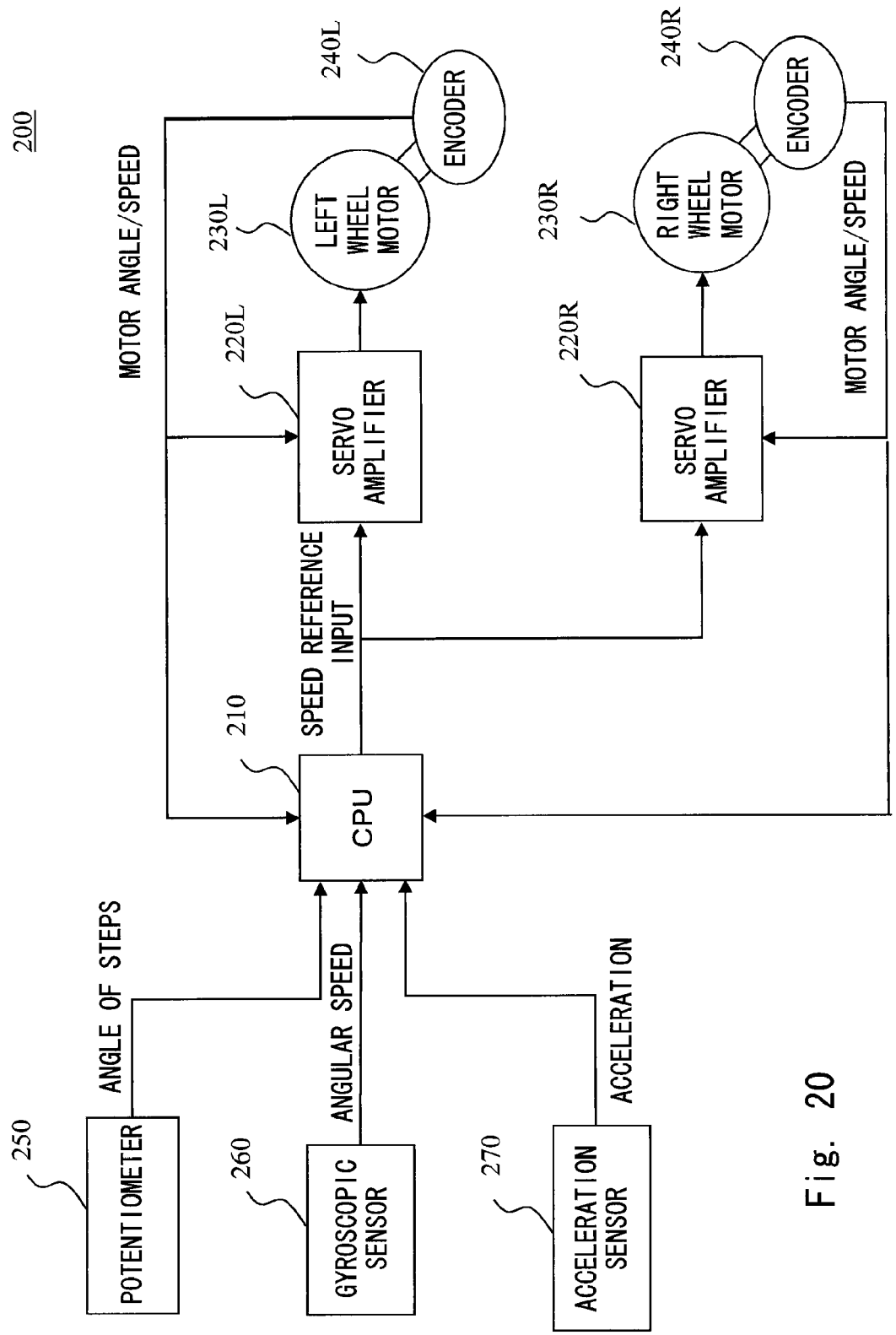
FIG. 20 is a configuration diagram of a control system of a traveling device in accordance with a fourth exemplary embodiment.
Figure 21:
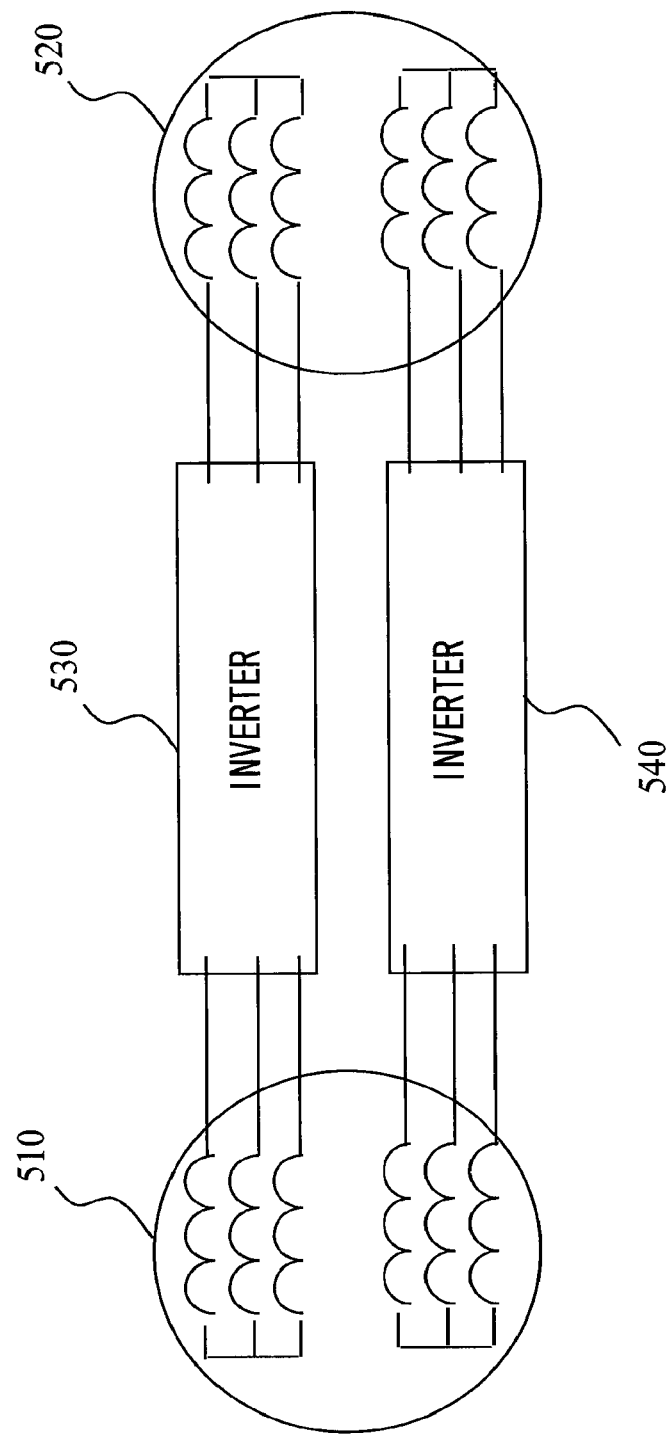
FIG. 21 is a configuration diagram of a motor drive system in related art.

FIG. 20 is a configuration diagram of a control system of the traveling device.

As shown in the figure, a control system 200 includes a control device 210, servo amplifiers 220L and 220R, wheel drive motors 230L and 230R, encoders 240L and 240R, a potentiometer 250, a gyroscopic sensor 260, and an acceleration sensor 270. The control device 210 is constructed, for example, from a microcomputer (CPU) and a storage device such as a RAM and a ROM.

A battery (not shown) and the pair of servo amplifiers 220L and 220R are connected to the control device 210. The servo amplifiers 220L and 220R control the rotation speeds and the rotation directions of the pair of wheel drive motors 230L and 230R independently of each other. Each of these servo amplifiers 220L and 220R includes a motor driver and the above-described motor drive system. Further, the servo amplifiers 220L and 220R output control signals to the pair of wheel drive motors 230L and 230R according to speed reference inputs.

The inclination sensor can detect the inclination angle (pitch angle) of the vehicle main body and the passenger while the traveling device is traveling. Further, the inclination sensor is constructed, for example, from a potentiometer 250 that detects the rotation angle of the steps, a gyroscopic sensor 260 that detects the inclination angle of the vehicle main body, an acceleration sensor 270 that detects the acceleration of the vehicle, and the like. For example, when the vehicle main body and the passenger are inclined forward or backward, the steps of the vehicle main body are also inclined in the same direction. This inclination sensor can detect an inclination angle corresponding to the inclination of the vehicle main body and the passenger. Then, the control device 210 controls the driving of the servo amplifiers 220L and 220R based on the inclination angle of the vehicle main body and the passenger detected by the inclination sensor so that the traveling device moves in the direction in which the vehicle main body and the passenger are inclined.

Other Exemplary Embodiments

Although examples in which a five-phase motor is used are explained in the above-described exemplary embodiments, the present invention is not limited to those examples. That is, the present invention can be applied to motors having five phases or more. In such cases, the power relay is configured so as to be able to cut off a supply power to at least one phase coil among the five or more phase coils. Then, when one or more phases among a plurality of phases of the motor fails, the motor drive system opens a contact point of the power relay corresponding to the failed phase and drives three or more phases that are disposed at roughly equal phase-intervals among a plurality of remaining phases in order to continue the driving of the motor.

Further, although two control units (CPU1 and CPU2) are used to control the inverter, the motor, and the power relay in the above-described second exemplary embodiment, the present invention is not limited to this configuration. That is, two or more CPUs may be used for the control. In such cases, each of the plurality of CPUs may control the driving of three or more phases in such a manner that they does not control the driving of the same three or more phases as each other. Further, each of the CPUs may control the driving of three or more phases including at least one phase that can be controlled by at least one of the other CPUs.

As has been explained so far, a motor drive system in accordance with the present invention includes, in view of ensuring the redundancy of the system, a five-phase motor, and when one of the phases fails, the number of phases used to drive the motor is reduced from five to three by using a power relay. Further, by controlling the driving of the motor having a plurality of phases with two or more control units, even if a control unit itself fails, the driving of the motor can be continued.

Note that the present invention is not limited to the above-described exemplary embodiments, and various modifications can be made without departing from the spirit of the present invention.

INDUSTRIAL APPLICABILITY

The present invention can be used, for example, in a motor drive system, a control method of a motor drive system, and a traveling device.

REFERENCE SIGNS LIST

100 MOTOR DRIVE CIRCUIT
10 FIVE-PHASE INVERTER
20 FIVE-PHASE MOTOR
30 POWER RELAY
101 MOTOR DRIVE SYSTEM
20 CONTROL UNIT
50 PRE-DRIVER
41 CURRENT CONTROLLER
42 dp-AXIS/TWO-PHASE COORDINATE CONVERSION UNIT
43 TWO-PHASE/FIVE-PHASE COORDINATE CONVERSION UNIT
44 PWM GENERATOR
45 FIVE-PHASE/TWO-PHASE COORDINATE CONVERSION UNIT
46 TWO-PHASE/dq-AXIS COORDINATE CONVERSION UNIT
60, 70 SHUNT RESISTOR
102 MOTOR DRIVE SYSTEM
81, 82 CONTROL UNIT
83 OR CIRCUIT
51 to 55 PRE-DRIVER
103 MOTOR DRIVE SYSTEM
84 SWITCH (SW)
200 CONTROL SYSTEM
210 CONTROL DEVICE (CPU)
220L, 220R SERVO AMPLIFIER
230L, 230R LEFT/RIGHT WHEEL MOTOR
240L, 240R ENCODER
250 POTENTIOMETER
260 GYROSCOPIC SENSOR
270 ACCELERATION SENSOR
510, 520 MOTOR
530, 540 INVERTER

The invention claimed is:

1. A motor drive system comprising:
a motor comprising a plurality of phase coils of five phases or more, in which, among the plurality of phase coils, first and second phase coils, the phases of which are not adjacent to each other, are connected to each other; third and fourth phase coils, the phases of which are not adjacent to each other, are connected to each other; and the first phase coil, the third phase coil, and a fifth phase coil are connected in a star connection;
an inverter connected to one end of each of the phase coils, the inverter being configured to convert a DC power into an AC power and supply the AC power to each phase of the motor;
a power relay configured so as to be able to cut off a supply power to at least one phase coil among the plurality of phase coils of the motor by using a first contact point disposed at other ends of the first and second phase coils and interposed between the star-connected coils, a second contact point disposed at other ends of the third and fourth phase coils and interposed between the star-connected coils, and a third contact point disposed at another end of the fifth phase coil and interposed between the star-connected coils; and
a control unit that generates a control signal for the inverter and thereby controls driving of the motor,
wherein, when one or more phase of the motor fails, the control unit opens a contact point of the power relay corresponding to the failed phase and drives three or more phases that are disposed at roughly equal phase-intervals among a plurality of remaining phases.

2. The motor drive system according to claim 1, wherein the control unit comprises a plurality of control units each of which controls driving of three or more phases among a plurality of phases of the motor, and
when one of the plurality of control units fails, a remaining non-failed control unit continues to control the driving of the motor.

3. The motor drive system according to claim 1, wherein the control unit comprises first and second control units each of which controls driving of three or more phases including at least one phase that can be controlled by either of the first and second control units among a plurality of phases of the motor, and
when the first control unit fails, the second control unit continues to control the driving of the motor.

4. A motor drive system comprising:
a motor comprising five phase coils, in which, among the five phase coils, first and second phase coils, the phases of which are not adjacent to each other, are connected to each other; third and fourth phase coils, the phases of which are not adjacent to each other, are connected to each other; and the first phase coil, the third phase coil, and a fifth phase coil are connected in a star connection;
an inverter connected to one end of each of the phase coils, the inverter being configured to convert a DC power into an AC power and supply the AC power to each phase of the motor;
a power relay configured so as to be able to cut off a supply power to one or two phase coil among the five-phase coils of the motor by using a first contact point disposed at other ends of the first and second phase coils and interposed between the star-connected coils, a second contact point disposed at other ends of the third and fourth phase coils and interposed between the star-connected coils, and a third contact point disposed at another end of the fifth phase coil and interposed between the star-connected coils; and
a control unit that generates a control signal for the inverter and thereby controls driving of the motor,
wherein, when one or two phases of the motor fail, the control unit opens a contact point of the power relay corresponding to the failed phase and drives three phases that are disposed at roughly equal phase-intervals among the remaining three or four phases.

5. The motor drive system according to claim 4, wherein the control unit comprises first and second control units each of which controls driving of three phases including at least one phase that can be controlled by either of the first and second control units among the five phases of the motor, and
when the first control unit fails, the second control unit continues to control the driving of the motor.

6. The motor drive system according to claim 5, further comprising an OR circuit to which a same inverter control signal is input from each of the first and second control units,
wherein an output signal from the OR circuit and inverter control signals for two phases that are output from the second control unit are input to the inverter.

7. The motor drive system according to claim 5, further comprising a switch that selects one of the same inverter control signals input from the first and second control units, respectively, according to priorities defined for the first and second control units, wherein
a higher priority is defined for the first control unit than that for the second control unit,
when the first control unit is operating properly, an output signal from the first control unit that is selected by the switch and inverter control signals for two phases that are output from the first control unit are input to the inverter, and when the first control unit fails, an output signal from the second control unit that is selected by the switch and inverter control signals for two phases that are output from the second control unit are input to the inverter.

8. A control method of a motor drive system, the motor drive system comprising:

a motor comprising a plurality of phase coils of five phases or more, in which, among the plurality of phase coils, first and second phase coils the phases of which are not adjacent to each other are connected to each other; third and fourth phase coils, the phases of which are not adjacent to each other, are connected to each other; and the first phase coil, the third phase coil, and a fifth phase coil are connected in a star connection;

an inverter connected to one end of each of the phase coils, the inverter being configured to convert a DC power into an AC power and supply the AC power to each phase of the motor; and a power relay configured so as to be able to cut off a supply power to at least one phase coil among the plurality of phase coils of the motor by using a first contact point disposed at other ends of the first and second phase coils and interposed between the star-connected coils, a second contact point disposed at other ends of the third and fourth phase coils and interposed between the star-connected coils, and a third contact point disposed at another end of the fifth phase coil and interposed between the star-connected coils, wherein, when one or more phases of the motor fail, the control method of a motor drive system opens a contact point of the power relay corresponding to the failed phase and drives three or more phases that are disposed at roughly equal phase-intervals among a plurality of the remaining phases.

9. A traveling device that performs inversion control by driving a wheel, comprising:

a motor that drives the wheel and comprises five phase coils, in which, among the five phase coils, first and second phase coils, the phases of which are not adjacent to each other, are connected to each other; third and fourth phase coils, the phases of which are not adjacent to each other, are connected to each other; and the first phase coil, the third phase coil, and a fifth phase coil are connected in a star connection;

an inverter connected to one end of each of the phase coils, the inverter being configured to convert a DC power into an AC power and supply the AC power to each phase of the motor;

a power relay configured so as to be able to cut off a supply power to one or two phase coils among the five-phase coils of the motor by using a first contact point disposed at other ends of the first and second phase coils and interposed between the star-connected coils, a second contact point disposed at other ends of the third and fourth phase coils and interposed between the star-connected coils, and a third contact point disposed at another end of the fifth phase coil and interposed between the star-connected coils; and a control unit that generates a control signal for the inverter and thereby controls driving of the motor, wherein, when one or two phases of the motor fail, the control unit opens a contact point of the power relay corresponding to the failed phase and drives three phases that are disposed at roughly equal phase-intervals among the remaining three or four phases.

10. The traveling device according to claim 9, wherein the control unit comprises first and second control units each of which controls driving of three phases including at least one phase that can be controlled by either of the first and second control units among the five phases of the motor, and when the first control unit fails, the second control unit continues to control the driving of the motor.

\* \* \* \* \*

UNITED STATES PATENT AND TRADEMARK OFFICE
CERTIFICATE OF CORRECTION

| | | |
|---|---|---|
| PATENT NO. | : 8,575,885 B2 | Page 1 of 1 |
| APPLICATION NO. | : 13/123270 | |
| DATED | : November 5, 2013 | |
| INVENTOR(S) | : Y. Okumatsu | |

It is certified that error appears in the above-identified patent and that said Letters Patent is hereby corrected as shown below:

In the Specification

Column 7, line 7, change "an a-axis" to -- an α-axis --.

Column 7, in line 3 of [Expression 1], change "R + pM" to -- R+ pL --.

Signed and Sealed this
Sixth Day of May, 2014

Michelle K. Lee
*Deputy Director of the United States Patent and Trademark Office*